(12) United States Patent
Schlichting et al.

(10) Patent No.: US 8,273,323 B2
(45) Date of Patent: Sep. 25, 2012

(54) HYDROGEN PRODUCTION METHOD

(75) Inventors: Holger Schlichting, Hofheim (DE);
Thomas Tork, Frankfurt am Main (DE)

(73) Assignee: Lurgi GmbH, Frankfurt am Main (DE)

( * ) Notice: Subject to any disclaimer, the term of this patent is extended or adjusted under 35 U.S.C. 154(b) by 595 days.

(21) Appl. No.: 12/442,552

(22) PCT Filed: Jul. 31, 2007

(86) PCT No.: PCT/EP2007/006746
§ 371 (c)(1),
(2), (4) Date: Oct. 27, 2009

(87) PCT Pub. No.: WO2008/037315
PCT Pub. Date: Apr. 3, 2008

(65) Prior Publication Data
US 2010/0111824 A1    May 6, 2010

(30) Foreign Application Priority Data

Sep. 26, 2006 (DE) .......................... 10 2006 045 379

(51) Int. Cl.
*C01B 3/02* (2006.01)
*C01B 3/24* (2006.01)
*C01B 17/04* (2006.01)

(52) U.S. Cl. .................. 423/650; 423/574.1; 423/648.1
(58) Field of Classification Search ............... 423/574.1, 423/648.1, 650, 651, 652, 653, 654
See application file for complete search history.

(56) References Cited

U.S. PATENT DOCUMENTS 3,798,316 A * 3/1974 Beavon ....................... 423/574.1
4,507,274 A * 3/1985 Broecker et al. ............ 423/574.1
(Continued)

FOREIGN PATENT DOCUMENTS
DE    3047830 A1    7/1982
(Continued)

OTHER PUBLICATIONS

English Language Abstract for DE 3047830.

*Primary Examiner* — Wayne Langel
(74) *Attorney, Agent, or Firm* — Norris McLaughlin & Marcus PA

(57) ABSTRACT

In a process for producing hydrocarbonaceous educts, the starting material is autothermally gasified by non-catalytic partial oxidation by adding oxygen-containing gas and hydrogen at temperatures of 1200 to 1500° C. and pressures of 15 to 100 $bar_{abs}$ to obtain a raw gas containing $H_2$ and CO as main components as well as the components $CO_2$, $H_2O$, $CH_4$ and traces of $H_2S$, COS, $C_nH_m$, $N_2$ and Ar, and subsequently the CO contained in the raw gas is converted to $CO_2$ and further $H_2$ by adding steam. An improvement of the process consists in that in a pressure-swing absorption process the converted raw synthesis gas is separated directly, i.e. without passing through a wash for removing $CO_2$ and $H_2S$, into high-purity $H_2$ and into a gas mixture containing $H_2S$, $CO_2$, $H_2$, CO, $CH_4$, Ar and $N_2$, the gas mixture is supplied to the tail gas wash of a Claus process, the $H_2S$ separated is introduced into the feed gas of the Claus process, and the waste gas of the tail gas wash, mixed with the tail gas of the Claus process, is burnt.

4 Claims, 1 Drawing Sheet

U.S. PATENT DOCUMENTS

| | | | |
|---|---|---|---|
| 4,623,533 A * | 11/1986 | Broecker et al. | 423/224 |
| 4,696,680 A * | 9/1987 | Ghate et al. | 95/103 |
| 4,801,438 A * | 1/1989 | Najjar et al. | 423/230 |
| 4,801,440 A * | 1/1989 | Najjar et al. | 423/418.2 |
| 4,889,699 A * | 12/1989 | Najjar et al. | 423/210 |
| 5,021,232 A * | 6/1991 | Hise et al. | 423/574.1 |
| 5,152,975 A * | 10/1992 | Fong et al. | 423/652 |
| 5,628,977 A * | 5/1997 | Heisel et al. | 423/573.1 |
| 6,517,801 B2 * | 2/2003 | Watson et al. | 423/574.1 |
| 6,776,974 B1 * | 8/2004 | Burmaster et al. | 423/574.1 |
| 6,967,063 B2 * | 11/2005 | Krumpelt et al. | 429/412 |
| 7,198,862 B2 * | 4/2007 | Baumann et al. | 429/412 |
| 7,220,505 B2 * | 5/2007 | Malhotra et al. | 429/411 |
| 7,357,908 B2 * | 4/2008 | Ramani et al. | 423/574.1 |
| 7,399,326 B2 * | 7/2008 | Zhang et al. | 48/61 |
| 2004/0213733 A1 * | 10/2004 | Gauthier et al. | 423/648.1 |
| 2006/0150812 A1 | 7/2006 | Mak | |

FOREIGN PATENT DOCUMENTS

| | | |
|---|---|---|
| WO | 93/10883 A | 6/1993 |

* cited by examiner

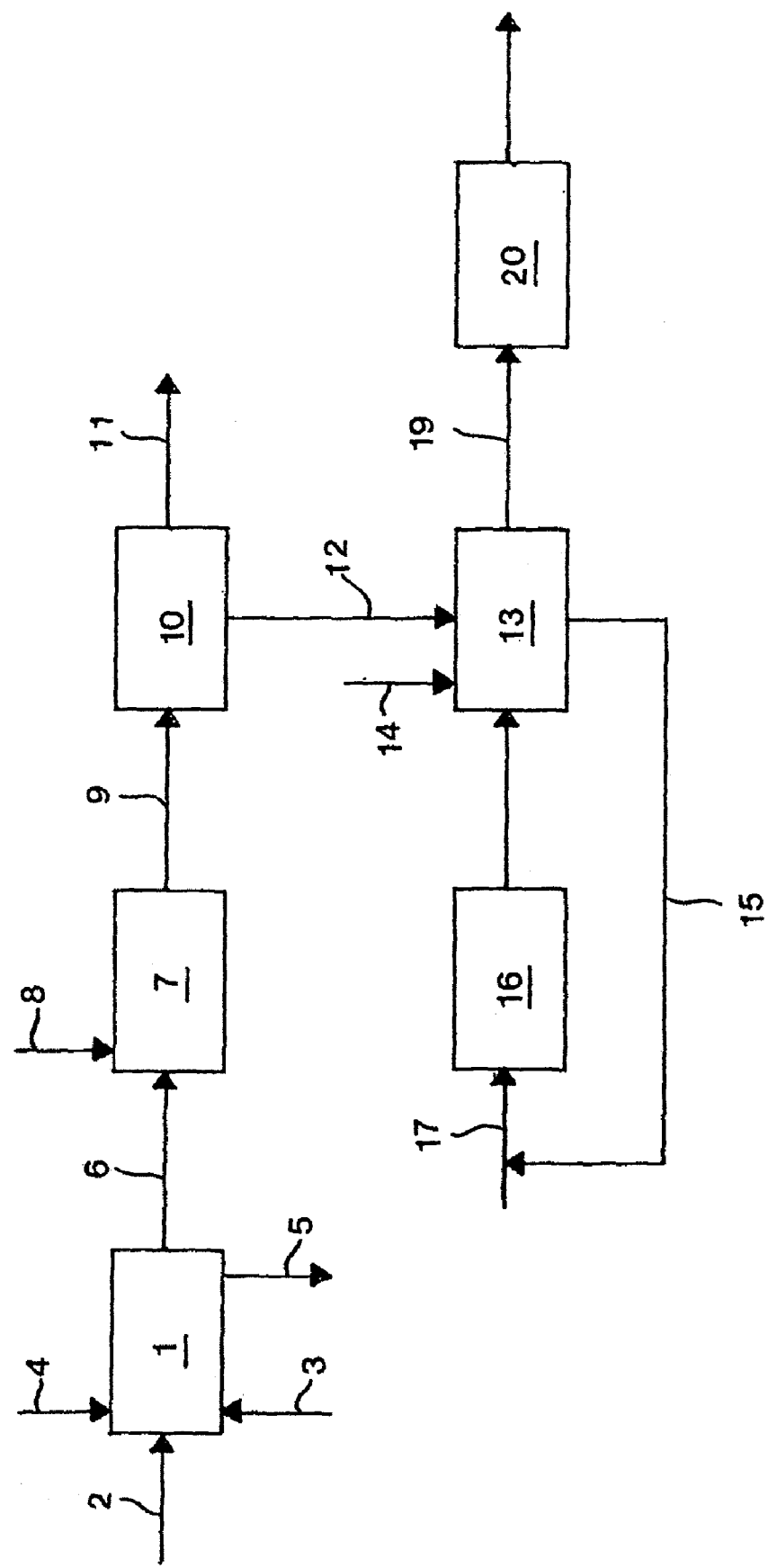

HYDROGEN PRODUCTION METHOD

This application is a 371 application of PCT/EP2007/006746 filed Jul. 31, 2007, which claims priority to the German application DE 10 2006 045 379.4 filed Sep. 26, 2006.

This invention relates to a process for producing $H_2$ from hydrocarbonaceous educts, such as refinery residues, petroleum, natural gas, petroleum gas, petroleum coke and coal, in which the starting material is autothermally gasified by non-catalytic partial oxidation in a first reaction stage by adding oxygen-containing gas and steam at a temperature of 1200 to 1500° C. and a pressure of 15 to 100 $bar_{abs}$ to obtain a raw gas containing $H_2$ and CO as main components as well as the components $CO_2$, $H_2O$, $CH_4$ and traces of $H_2S$, COS, $C_nH_m$, N2 and Ar, and the metal ashes contained in the raw gas are removed as molten slag together with the soot by means of quenching, and in a second reaction stage the CO contained in the raw gas is converted to $CO_2$ and further $H_2$ by adding steam.

With the Multi Purpose Gasification Process (MPG process) described in the company brochure 1700 e/4.04115 of Lurgi AG, Frankfurt am Main, a wide variety of hydrocarbonaceous liquid, gaseous and solid starting materials, such as refinery residues, petroleum, natural gas, petroleum gas, chemical wastes, coal and petroleum coke, can autothermally be converted by non-catalytic partial oxidation to obtain raw gas substantially consisting of $H_2$ and CO according to the reaction equation

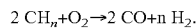
$$2\ CH_n + O_2 \rightarrow 2\ CO + n\ H_2.$$

In dependence on the composition of the starting material and the oxygen carrier, such as air, air enriched with oxygen or pure oxygen, the gasification temperature is 1200 to 1450° C. and the gasification pressure is 1 to 100 $bar_{abs}$ and 30 to 70 $bar_{abs}$ for the case of chiefly producing $H_2$. Beside the desired components $H_2$ and CO, the raw gas obtained also contains the components $CO_2$, $H_2O$, $CH_4$ and traces of $H_2S$, COS, $C_nH_m$, $N_2$ and Ar. By quenching with water, the metal ashes contained in the raw gas are removed from the process as molten slag together with the soot. The oxygen carrier mixed with steam is supplied to the burner of the gasification plant. In a second reaction stage, the CO contained in the raw gas is converted with steam to obtain $CO_2$ and further $H_2$ according to the reaction equation

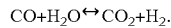
$$CO + H_2O \leftrightarrow CO_2 + H_2.$$

The raw synthesis gas generated in this way contains 50 to 80 vol-% of $H_2$ and 10 to 40 vol-% of $CO_2$ as desired components and $H_2S$, CO, COS, $CH_4$ and $C_nH_m$ as undesired components, which are absorbed in two stages by means of cold methanol loaded with $CO_2$ as physical solvent. The solubilities of the various components in methanol differ very much, whereby a selective separation of the components, for instance of $H_2S$ and $CO_2$, is possible at pressures of 20 to 80 $bar_{abs}$. The entering cooled raw synthesis gas initially is supplied to the $H_2S$ absorber, and $H_2S$ and other sulfur compounds are absorbed, so that the residual content of sulfur in the synthesis gas lies below 0.1 ppm. For regeneration, the methanol loaded with $H_2S$ is expanded to medium pressure and then heated to boiling temperature, so that all gases absorbed are released. From the gas rich in $H_2S$, pure sulfur is recovered by a Claus process. From this gas, $CO_2$ is separated in the second stage, so that the $CO_2$ concentration in the gas decreases to 10 ppm to 3 vol-%. According to the Rectisol® process, the solvent loaded with $CO_2$ is expanded to a low pressure, and the $CO_2$ released free of sulfur either is discharged to the atmosphere or used for instance for producing urea. Related processes include the so-called Purisol® process, in which N-methyl-2-pyrrolidone (NMP) is used as physical solvent, and the Selexol® process, in which a mixture of polyethylene glycol ethers is utilized as physical solvent. With both processes, the undesired components can be removed from the raw synthesis gas down to a residual content of <1 ppm $H_2S$ and 0.1 to 3 vol-% $CO_2$. The removal of $H_2S$ and $CO_2$ from the raw synthesis gas can also be effected by means of an aqueous amine solution with the process of the amine wash, such as the aMDEA® process.

By using the pressure-swing absorption process, the synthesis gas left upon removal of $CO_2$ and $H_2S$ is separated into a fraction consisting of high-purity $H_2$ and a small fraction containing the residual components, which can for instance be used as fuel gas.

The raw synthesis gas formed upon conversion of CO to $CO_2$ and further $H_2$ contains almost the entire carbon of the feed gas in the form of $CO_2$ with a content of up to 40 vol-% and in addition $\leq 1$ vol-% of $H_2S$, depending on the feedstock. The selective separation of $H_2S$ from the raw synthesis gas, without at the same time separating major amounts of $CO_2$, requires a relatively great technical effort. The selective separation is necessary for the further processing of the phase rich in $H_2S$ by the Claus process. The final cleaning of the remaining $H_2$ is effected by the pressure-swing absorption process.

In the production of $H_2$ from hydrocarbonaceous educts by the process described above, it is the object of the present invention to omit washing the raw synthesis gas generated by conversion, which leaves the second reaction stage, by means of physical or chemical solvents for removing $CO_2$ and $H_2S$.

The solution of this object consists in that the converted raw synthesis gas leaving the second reaction stage is separated into high-purity $H_2$ and into a gas mixture containing 0.5 to 10 vol-% of $H_2S$, 50 to 95 vol-% of $CO_2$, 5 to 20 vol-% of $H_2$, 0.1 to 10 vol-% of CO and 0.1 to 10 vol-% of $CH_4$, Ar, $N_2$ by a pressure-swing absorption process in a third stage, the gas mixture is supplied to the tail gas wash of a Claus process, the $H_2S$ selectively separated from the gas mixture is introduced into the feed gas of the Claus process, and the desulfurized waste gas of the tail gas wash, mixed with the tail gas of the Claus process, is burnt.

One aspect of the invention consists in recirculating the $H_2S$ recovered in the regeneration of the washing agent of the tail gas wash of the Claus process into the Claus process, to thereby increase the yield of sulfur.

For the case that the waste gas obtained in the combustion of the desulfurized waste gas of the tail gas wash still contains traces of $H_2S$, the waste gas is subjected to a post-combustion.

Expediently, the thermal energy obtained in the combustion of the desulfurized waste gas of the tail gas wash of the Claus process is transferred to the low-temperature fluid flowing in a heat exchanger for the purpose of steam generation, heating or the like.

EXAMPLE

The process of the invention will be explained in detail by means of an embodiment in conjunction with a simplified block flow diagram.

To a chemical reactor (1) lined with a layer of refractory material, which is connected with a quenching tank, residue oils are supplied via conduit (2) via the burner arranged at the top of the reactor, oxygen is supplied via conduit (3) and steam is supplied via conduit (4). Through an outlet opening located in the bottom of the reactor (1), the raw gas generated flows into a quenching tank and leaves the same through a laterally arranged gas outlet. Upon leaving the reactor (1), the hot raw gas is directly cooled to saturated steam temperature by injecting water into the quenching nozzle. The liquid slag formed flows off via the reactor wall and is quenched in the quenching tank. In the glass-like slag pellets heavy metals and non-soluble compounds are incorporated, which are discharged via conduit (5). The raw gas generated by non-catalytic partial oxidation at a gasification pressure of 50 $bar_{abs}$ and a gasification temperature of 1350° C. consists of 45 vol-% of $H_2$, 45 vol-% of CO, 5 vol-% of $CO_2$ and <1 vol-% of $H_2S$ and flows from the quenching tank via conduit (6) into the converter (7), in which the CO is reacted with steam supplied via conduit (8) to obtain $CO_2$ and further $H_2$. The raw synthesis gas containing 62 vol-% of $H_2$, 35 vol-% of $CO_2$, 2 vol-% of CO and 1 vol-% of $H_2S$, which is discharged via conduit (9), is charged to a pressure-swing absorption plant (10), in which the raw synthesis gas is selectively separated under a pressure of 48 $bar_{abs}$ into $H_2$, which is discharged from the pressure-swing absorption plant (10) via conduit (11), and the remaining components, which are adsorbed on porous material. As soon as the porous material is loaded completely, the pressure is decreased and a gas mixture of 2 vol-% of $H_2S$, 78 vol-% of $CO_2$, 13 vol-% of $H_2$, 2 vol-% of CO, the rest $CH_4$, $N_2$, Ar, is recovered. Via conduit (12), the gas mixture is mixed with the tail gas of the Claus plant and together supplied to a tail gas cleaning stage (13) of a Claus plant, and $H_2S$ is selectively washed out of the gas mixture by means of a washing agent flowing in via conduit (14). As washing agent, selectively acting chemical washing agents, in particular amines such as methyldiethanolamine (MDEA) or sterically hindered amines (Flexsorb SE®) typically are used. In a regenerator, the washing agent is liberated from absorbed $H_2S$ and other gas components, and via conduit (15) the gas formed, which has a relatively high concentration of $H_2S$, is fed into the acid gas stream flowing in to a Claus plant (16) from other process units via conduit (17). The remaining gas mixture is combined with the gas components flowing off from the Claus plant (16) via conduit (18) into the tail gas cleaning stage (13) and flows to the combustion plant (20) via conduit (19).

The advantage achieved with the process of the invention in particular must be seen in that the raw synthesis gas of the second reaction stage generated by conversion is charged directly to the pressure-swing absorption process for separation into high-purity $H_2$ and into a gas mixture containing $CO_2$, $H_2$, $H_2S$, CO, $CH_4$, $N_2$ and Ar, and the separation of $H_2S$ from the gas mixture is performed in the tail gas wash of a Claus process. By means of this measure, the physical and chemical gas wash of the converted raw synthesis gas can be omitted, and hence the investment costs for a complete plant for the recovery of hydrogen from hydrocarbonaceous educts can be reduced by about 20%. In addition, the emission of $CO_2$ is avoided by using the process of the invention.

The invention claimed is:

1. A process for producing hydrogen from hydrocarbonaceous educts in which the starting material is autothermally gasified by non-catalytic partial oxidation in a first reaction stage by adding oxygen-containing gas and steam at a temperature of 1200 to 1500° C. and a pressure of 15 to 100 $bar_{abs}$ to obtain a raw gas containing $H_2$ and CO as main components as well as the components $CO_2$, $H_2O$, $CH_4$ and traces of $H_2S$, COS, $C_nH_m$, $N_2$ and Ar, and the metal ashes contained in the raw gas are removed as molten slag together with the soot by means of quenching, and in a second reaction stage the CO contained in the raw gas is converted to $CO_2$ and further $H_2$ by adding steam, wherein the converted raw synthesis gas leaving the second reaction stage is separated into high-purity $H_2$ and into a gas mixture containing 0.5 to 10 vol-% of $H_2S$, 50 to 95 vol-% of $CO_2$, 5 to 20 vol-% of $H_2$, 0.1 to 10 vol-% of CO and 0.1 to 10 vol-% of $CH_4$, Ar, $N_2$ by a pressure-swing absorption process in a third stage, the gas mixture is supplied to a tail gas wash of a Claus process, $H_2S$ selectively separated from the gas mixture is introduced into the feed gas of the Claus process, and the desulfurized waste gas of the tail gas wash, mixed with the tail gas of the Claus process, is burnt.

2. The process according to claim 1, wherein the $H_2S$ recovered in the regeneration of the washing agent of the tail gas wash of the Claus process is recirculated to the Claus process.

3. The process according claims 1, wherein the thermal energy obtained in the combustion of the desulfurized waste gas of the tail gas wash is transferred to low-temperature fluids flowing in heat exchangers.

4. The process according claims 1, wherein the waste gas obtained in the combustion of the desulfurized waste gas of the tail gas wash is subjected to a postcombustion.

* * * * *

UNITED STATES PATENT AND TRADEMARK OFFICE
CERTIFICATE OF CORRECTION

PATENT NO.        : 8,273,323 B2                                Page 1 of 1
APPLICATION NO.   : 12/442552
DATED             : September 25, 2012
INVENTOR(S)       : Holger Dropsch et al.

It is certified that error appears in the above-identified patent and that said Letters Patent is hereby corrected as shown below:

On the Title Page

In line 4 and 5 of Item [57], the Abstract:

"… partial oxidation by adding oxygen-containing gas and <u>hydrogen</u> …" should read -- partial oxidation by adding oxygen-containing gas and steam --

Signed and Sealed this
Seventeenth Day of June, 2014

Michelle K. Lee
*Deputy Director of the United States Patent and Trademark Office*